United States Patent
Shin (10) Patent No.: US 8,010,752 B2
(45) Date of Patent: Aug. 30, 2011

(54) PERFORMING INITIALIZATION FOR NON ACCESS-SELECTED MEMORY DEVICE SUPPORTING MULTIMEDIACARD (MMC) INTERFACE

(75) Inventor: Young Su Shin, Daegu Metropolitan (KR)

(73) Assignee: Samsung Electronics Co., Ltd., Maetan-dong, Yeongtong-gu, Suwon-si, Gyeonggi-do (KR)

(*) Notice: Subject to any disclaimer, the term of this patent is extended or adjusted under 35 U.S.C. 154(b) by 401 days.

(21) Appl. No.: 11/821,273

(22) Filed: Jun. 22, 2007

(65) Prior Publication Data
US 2008/0104304 A1 May 1, 2008

(30) Foreign Application Priority Data
Oct. 26, 2006 (KR) .................. 10-2006-0104672

(51) Int. Cl.
G06F 13/00 (2006.01)

(52) U.S. Cl. ......... 711/151; 711/103; 711/115; 711/150

(58) Field of Classification Search .................. 711/104, 711/105, 154, 103, 115, 150, 151
See application file for complete search history.

(56) References Cited

U.S. PATENT DOCUMENTS

| 5,717,638 | A | * | 2/1998 | Kim .................... 365/189.04 |
| 5,887,145 | A |   | 3/1999 | Harari et al. .................. 395/282 |
| 6,212,598 | B1 |  | 4/2001 | Jeddeloh .................... 711/105 |
| 6,763,437 | B1 | * | 7/2004 | Nguyen et al. .............. 711/147 |
| 7,200,743 | B1 | * | 4/2007 | Malpass ........................ 713/1 |
| 2003/0007406 | A1 | * | 1/2003 | Kyung ......................... 365/222 |
| 2003/0093606 | A1 | * | 5/2003 | Mambakkam et al. ....... 710/305 |
| 2003/0229746 | A1 |   | 12/2003 | Liu et al. |
| 2005/0005045 | A1 | * | 1/2005 | Kim et al. .................. 710/74 |
| 2005/0125620 | A1 |   | 6/2005 | Parthasarathy et al. |
| 2008/0129379 | A1 | * | 6/2008 | Copeland .................. 330/149 |
| 2008/0130787 | A1 | * | 6/2008 | Copeland .................. 375/297 |
| 2008/0313388 | A1 | * | 12/2008 | Chow et al. ................. 711/103 |

FOREIGN PATENT DOCUMENTS

| CN | 1340770 | 3/2002 |
| EP | 1182572 | 2/2002 |
| EP | 1191444 | 3/2002 |
| KR | 2001-76518 | 8/2001 |
| KR | 2005-18255 | 2/2005 |
| WO | WO 03/073300 | 9/2003 |

* cited by examiner

Primary Examiner — Shane M Thomas
Assistant Examiner — Sean Rossiter
(74) Attorney, Agent, or Firm — Cha & Reiter, LLC (57) ABSTRACT

A storage interfacing method and apparatus for a mobile terminal are disclosed. The storage interfacing method utilizes a plurality of storage devices. The method includes identifying the storage devices, detecting an occurrence of an access request event to one of the identified storage devices, determining whether the access-requested storage device is an access-selected storage device, and performing, if the access-requested storage device is an access-selected storage device, a data transfer operation associated with the access request event on the access-selected storage device without access initialization and access-selection. The apparatus includes a first storage device supporting a MultiMediaCard (MMC) interface, a second storage device compatible with the MMC interface, and a control unit for controlling the first and second storage devices, according to the MMC interface, through control and data buses shared by the first and second storage devices.

21 Claims, 5 Drawing Sheets

PERFORMING INITIALIZATION FOR NON ACCESS-SELECTED MEMORY DEVICE SUPPORTING MULTIMEDIACARD (MMC) INTERFACE

CLAIM OF PRIORITY

This application claims the benefit under 35 U.S.C. §119(a) of a Korean Patent Application filed in the Korean Intellectual Property Office on Oct. 26, 2006 and assigned Serial No. 2006-0104672, the entire disclosure of which is hereby incorporated by reference.

BACKGROUND OF THE INVENTION

1. Field of the Invention

The present invention relates generally to a storage media interface and, more particularly, to a storage interfacing method and apparatus that enables different kinds of storage devices to share a bus though a MultiMediaCard (MMC) interface.

2. Description of the Related Art

An advanced mobile terminal includes a call processor and an application processor or a single call/application processor. The call processor is used to process base communication functions related to phone calls and messages. The application processor is mainly used to process and control various supplementary functions related to a camera, multimedia, an electronic dictionary and the like. The mobile terminal further includes a plurality of mass storage devices to store voluminous multimedia data such as music files, photographs and moving images. For example, a NAND flash memory is used as an internal mass storage device. A Secure Digital (SD) card or MultiMediaCard (MMC) card is mainly used as an external mass storage device. Individual mass storage devices are connected to the application processor through separate storage interfaces.

Figure 1:
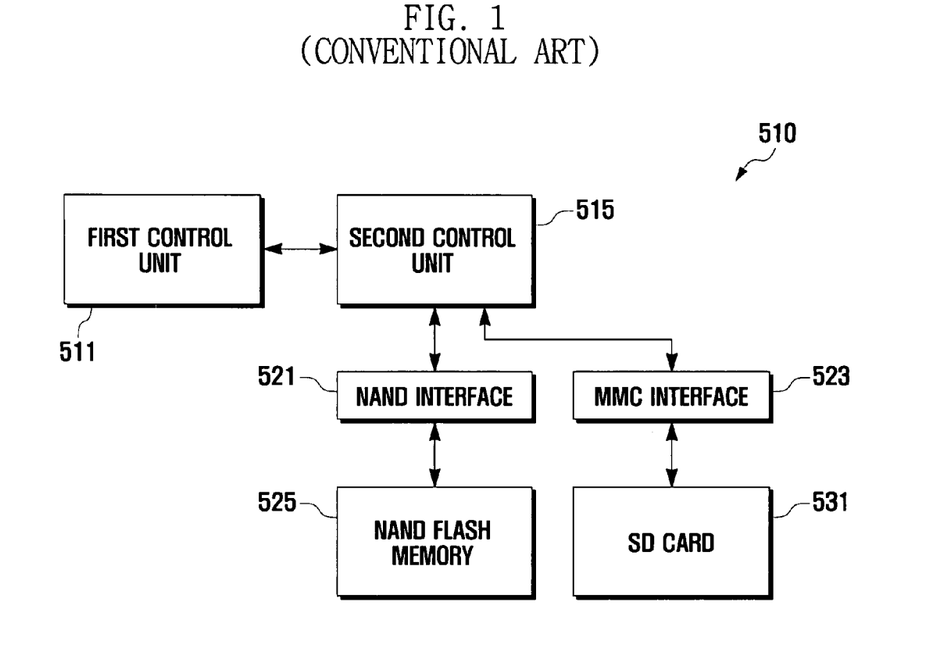
FIG. 1 illustrates a conventional storage interfacing apparatus.

FIG. 1 illustrates a conventional storage interfacing apparatus 510 using NAND flash technology for a mobile terminal.

Referring to FIG. 1, the storage interfacing apparatus 510 includes first and second control units 511 and 515, respectively, serving as a call processor and an application processor, respectively. The second control unit 515 is connected to a NAND flash memory 525 through a NAND interface 521, and to an SD card 531 through an MMC interface 523. Under the control of the first control unit 511, the second control unit 515 has access to data stored in the NAND flash memory 525 and the SD card 531. The second control unit 515 includes a NAND flash memory controller and an SD card controller. For data access, the second control unit 515 is connected to the NAND flash memory 525 via a bus, and to the SD card 531 via another bus.

In the storage interfacing apparatus 510, the second control unit 515 does not simultaneously access the NAND flash memory 525 and the SD card 531. Separate storage interfaces for the NAND flash memory 525 and the SD card 531 may cause an increase in both the number of pins and the size of the second control unit 515.

Recently, a new NAND flash memory supporting an MMC interface has been introduced as a high-speed mass storage device. However, the conventional storage interfacing apparatus 510 does not provide an interface between the new NAND flash memory and a different mass storage type.

The above problems may be common to other device-specific interfacing apparatuses, and to other control units controlling and accessing different types of mass storage devices.

SUMMARY OF THE INVENTION

The present invention reduces or overcomes at least the above noted problems and provides additional advantages, by providing a storage interfacing method and apparatus that enables a plurality of mass storage devices to share a bus, thereby leading to a decrease in the number of pins, size and cost of a control unit.

Another aspect of the present invention is to provide a storage interfacing method and apparatus that enables a control unit to control different types of mass storage devices through a shared MultiMediaCard (MMC) interface for effective data access.

In accordance with an exemplary embodiment of the present invention, there is provided a storage interfacing method utilizing a plurality of storage devices for a mobile terminal, the method including the steps of detecting an occurrence of an access request event to one of the storage devices, determining whether the access-requested storage device is an access-selected storage device, and performing, if the access-requested storage device is an access-selected storage device, a data transfer operation associated with the access request event on the access-selected storage device, without access initialization of the storage devices and access-selection of the access-requested storage device.

In accordance with another exemplary embodiment of the present invention, a storage interfacing apparatus is provided for a mobile terminal, the apparatus including a first storage device supporting a MultiMediaCard (MMC) interface, a second storage device compatible with the MMC interface, a first control unit for call processing, and a second control unit controlled by the first control unit, for controlling the first and second storage devices, according to the MMC interface, through control and data buses shared by the first and second storage devices.

BRIEF DESCRIPTION OF THE DRAWINGS

The present invention will be more apparent from the following detailed description in conjunction with the accompanying drawings, in which.

DETAILED DESCRIPTION OF THE INVENTION

Hereinafter, exemplary embodiments of the present invention are described in detail with reference to the accompanying drawings. The same reference symbols identify the same or corresponding elements in the drawings. Detailed descriptions of constructions or processes known in the art may be omitted to avoid obscuring the invention in unnecessary detail.

In the description, an MMC storage device (or memory) refers to a storage device supporting an MMC interface as a native interface. An MMC-compatible storage device refers to a storage device other than an MMC storage device that is operable in combination with the MMC interface. An MMC storage device may be a fixed internal storage device such as an MMC flash memory. An MMC-compatible storage device may be a removable external storage device such as an MMC-compatible SD, compact flash (CF), extreme digital picture (XD), memory stick (MS), or MMC card.

Figure 2:
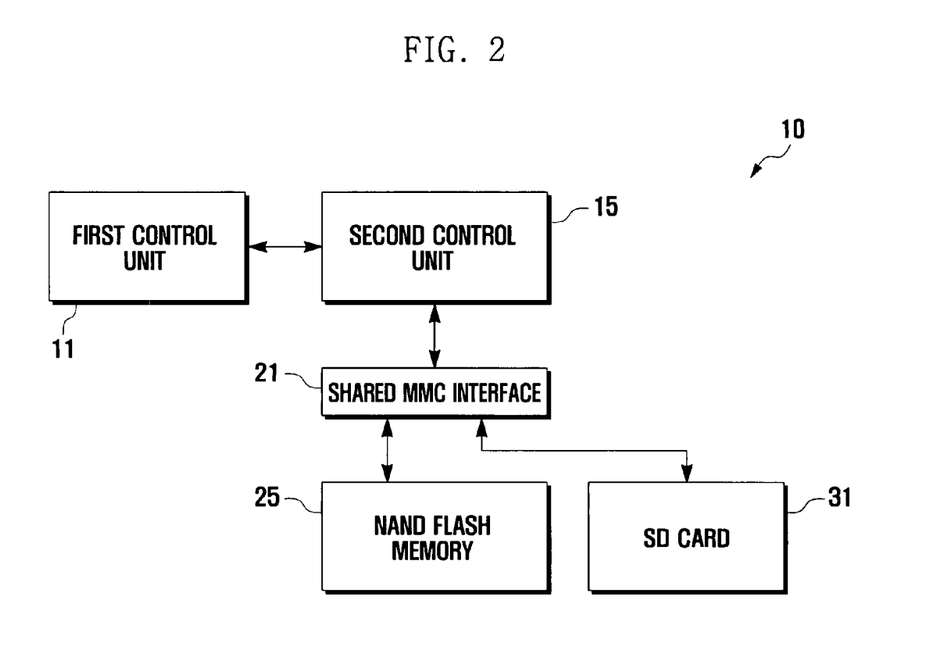
FIG. 2 illustrates a storage interfacing apparatus according to an exemplary embodiment of the present invention.
Figure 3:
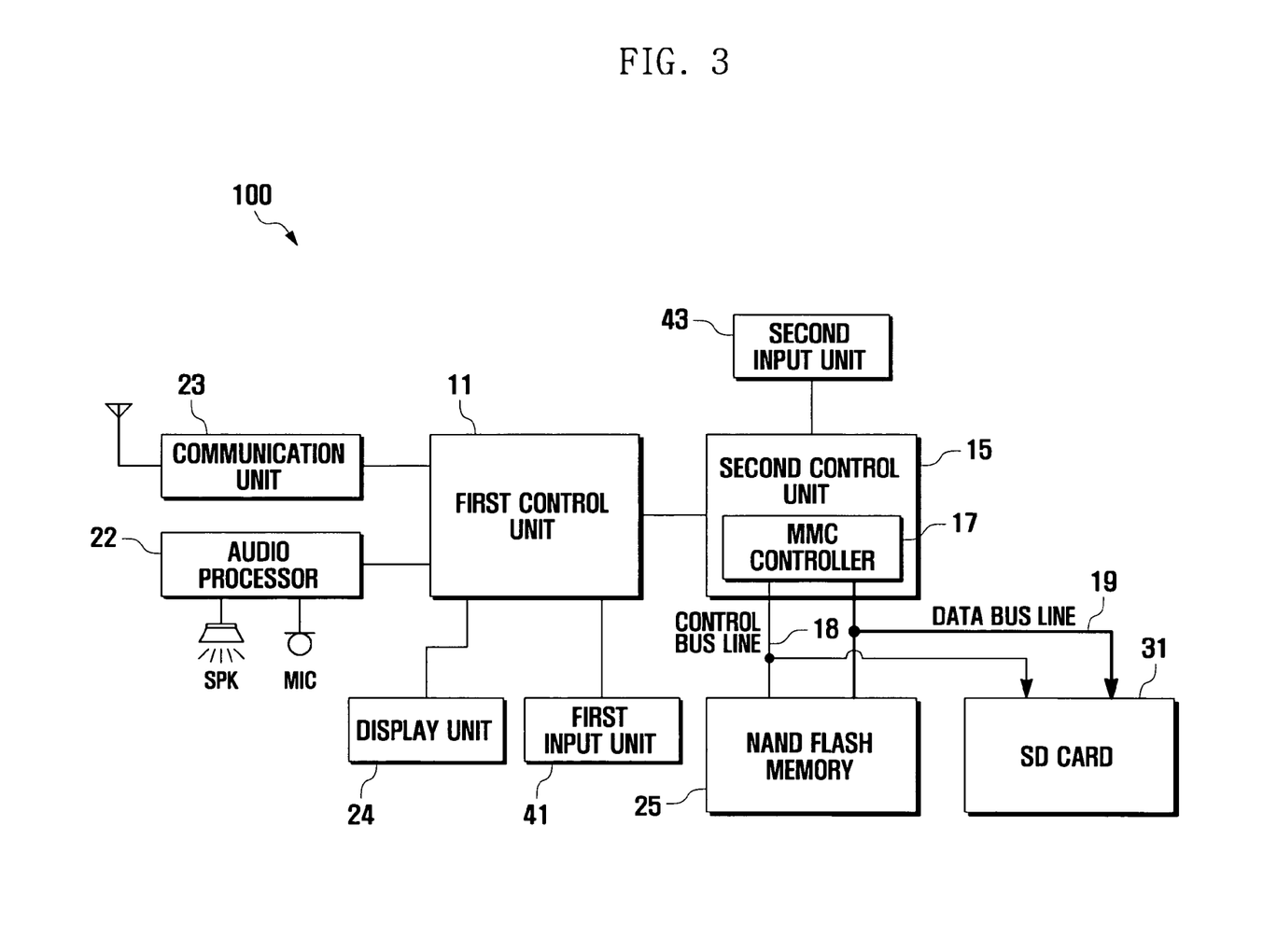
FIG. 3 illustrates a mobile terminal utilizing the storage interfacing apparatus of FIG. 2.

FIG. 2 illustrates a storage interfacing apparatus according to an exemplary embodiment of the present invention. FIG. 3 illustrates a mobile terminal utilizing the storage interfacing apparatus of FIG. 2.

Referring to FIG. 2, the storage interfacing apparatus 10 includes a first and second control units 11 and 15, respectively, a shared MMC interface 21, a NAND flash memory 25 supporting the MMC standard, and a SD card 31 compatible with the MMC standard. Referring to FIG. 3, the mobile terminal 100 includes the storage interfacing apparatus 10, and further includes an audio processor 22, a communication unit 23, a display unit 24, first and second input units 41 and 43, respectively.

The first and second control units 11 and 15 are interconnected through a bus to exchange data and control signals. The MMC NAND flash memory 25 and the MMC-compatible SD card 31 share the MMC interface 21.

For data access, the MMC NAND flash memory 25 and MMC-compatible SD card 31 are connected to the second control unit 15 though the shared MMC interface 21. As pin functions of the SD card 31 correspond to those of the MMC NAND flash memory 25, the SD card 31 can be accessed through the MMC interface 21.

The first control unit 11 can be a call processor, such as a Qualcomm's Mobile Station Modem chip, for controlling the overall operation of the mobile terminal 100. The second control unit 15 can be an application processor, such as an ARM processor, for supporting multimedia features.

The first and second input units 41 and 43 are respectively connected to the first and second control units 11 and 15, and input commands and information from the user. The second control unit 15 can perform an operation requested by the user independently of the first control unit 11. Each of the first and second input units 41 and 43 may include various means for generating user input signals, for example, a key pad, touch screen and touch pad.

The second control unit 15 is connected to the NAND flash memory 25 and SD card 31 through the shared MMC interface 21. The second control unit 15 includes an MMC controller 17 for controlling data access to the NAND flash memory 25 and SD card 31. For example, MoviNAND devices may be used as the NAND flash memory 25.

The NAND flash memory 25 and SD card 31 share a control bus line 18 and data bus lines 19 connected to the second control unit 15, and have a compatible pin configuration. Typically, the NAND flash memory 25 has eight data bus lines and one control bus line, and the SD card 31 has four data bus lines and one control bus line. Thus, the NAND flash memory 25 and the SD card 31 share four data bus lines 19 and one control bus line 18.

The display unit 24 displays call related information, multimedia information and incoming call alerts. The audio processor 22 processes audio data such as voice signals and music files. The communication unit 23 performs wireless communication operations.

Figure 4:
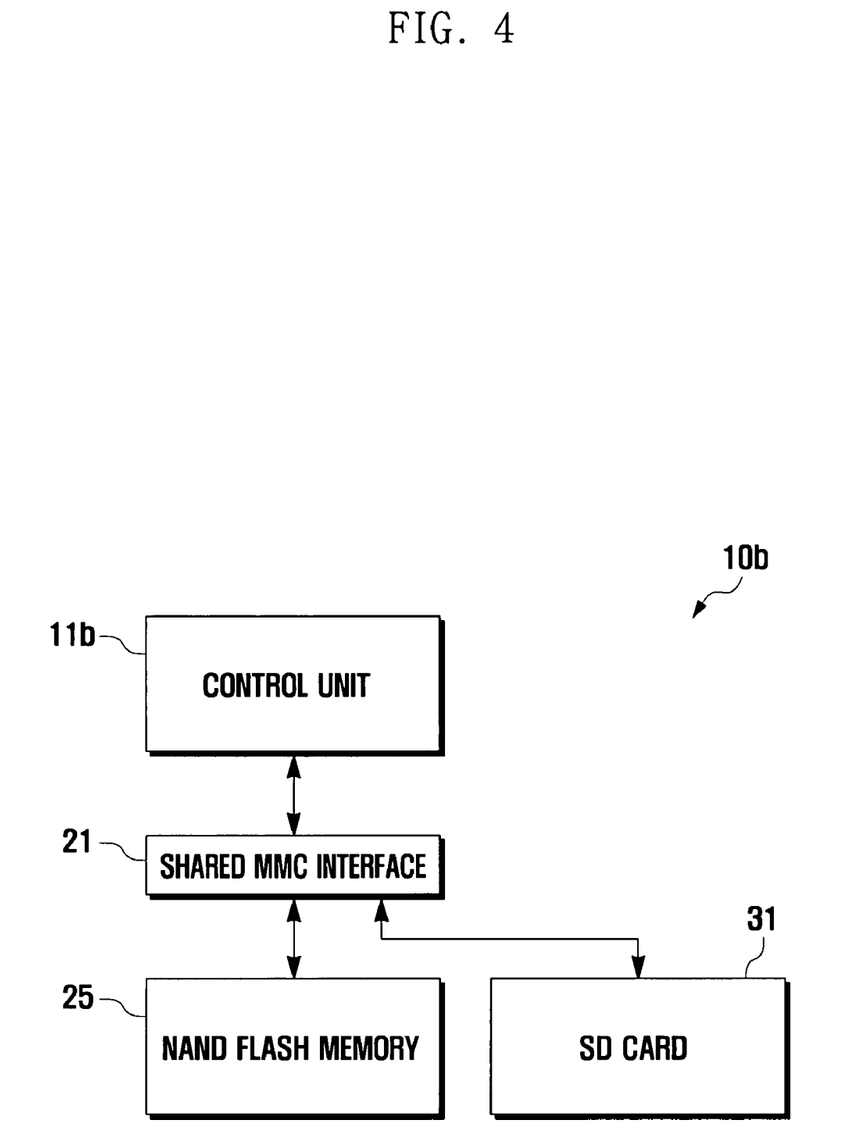
FIG. 4 illustrates a storage interfacing apparatus according to another exemplary embodiment of the present invention.

FIG. 4 illustrates a storage interfacing apparatus according to another exemplary embodiment of the present invention.

The storage interfacing apparatus 10b of FIG. 4 includes a single control unit 11b, different from the storage interfacing apparatus 10a of FIG. 2. The control unit 11b is a control processor performing both communication and multimedia functions. The control unit 11b controls and accesses the NAND flash memory 25 supporting the MMC standard and the SD card 31 compatible with the MMC standard through the shared MMC interface 21.

Figure 5:
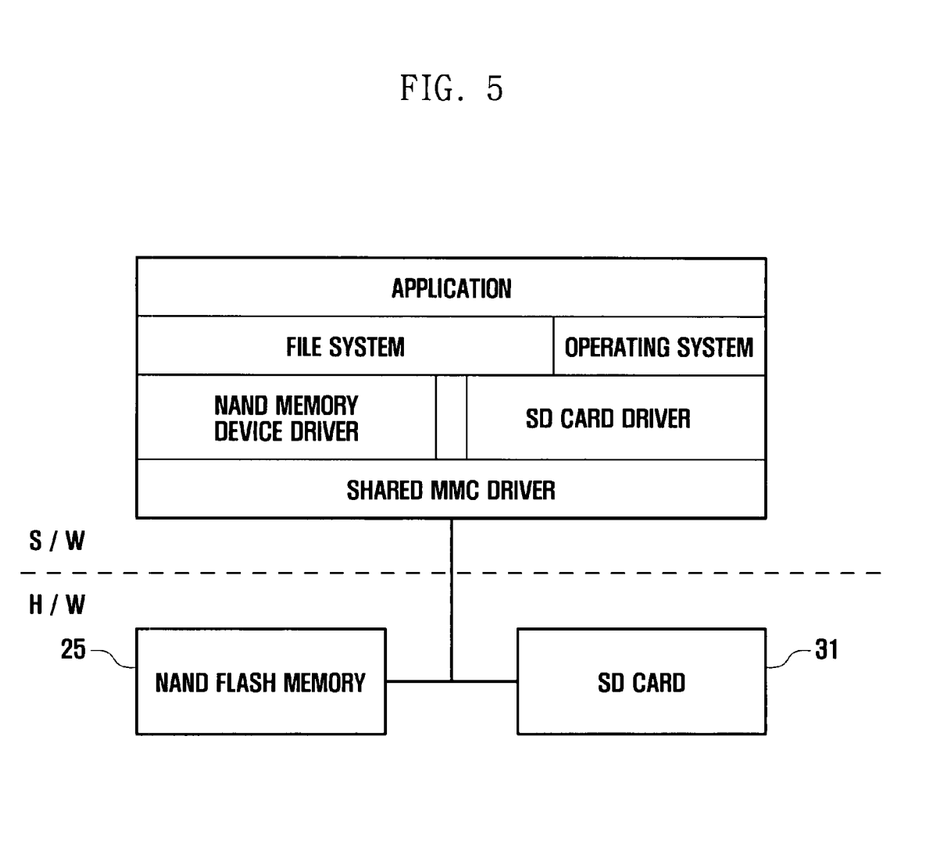
FIG. 5 illustrates a software architecture for sharing an MMC interface in the apparatus of FIG. 2.

FIG. 5 illustrates a software architecture for sharing an MMC interface in the apparatus of FIG. 2. The software architecture is composed of a shared MMC driver, NAND memory device driver, SD card driver, file system, operating system, and application.

Referring to FIGS. 3 and 5, the second control unit 15 facilitates data access to the NAND flash memory 25 and SD card 31 through the file system, NAND memory device driver, SD card driver, and shared MMC driver in order to execute an application program on top of the operating system.

The second control unit 15 executes various application programs to perform requested operations, for example, moving image display, audio file playing, photographing with a camera, and electronic dictionary searching. The second control unit 15 interprets instructions from the first control unit 11, and makes data access to the NAND flash memory 25 and SD card 31, if necessary. The second control unit 15 uses the file system to store and manage data as files and directories.

Figure 6:
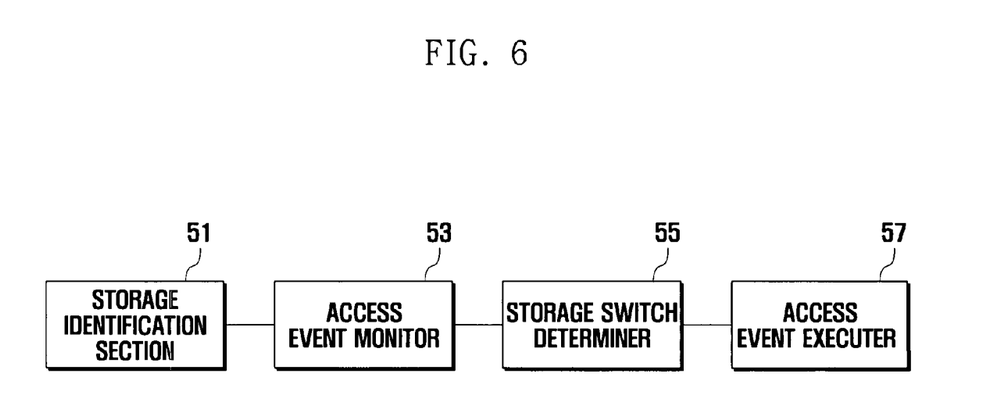
FIG. 6 illustrates a second control unit in the apparatus of FIG. 2.

FIG. 6 illustrates the second control unit 15 in the apparatus of FIG. 2.

Referring to FIGS. 3 and 6, the second control unit 15 includes a storage identification section 51, an access event monitor 53, a storage switch determiner 55, and an access event executer 57.

The storage identification section 51 identifies mass storage devices connected to the second control unit 15. In response to occurrence of a reset event, if a mass storage device has no unique identifier, the storage identification section 51 assigns a unique identifier to the mass storage device. If a mass storage device has a unique identifier, the storage identification section 51 reads the unique identifier thereof. For example, for an MMC NAND flash memory 25 that normally has no unique identifier, a unique identifier is assigned thereto by the second control unit 15 acting as a host. For an SD card 31 that has a preset unique identifier, the unique identifier therefrom is read and identified. The second control unit 15 manages unique identifiers of the identified storage devices as relative card addresses (RCA).

The access event monitor 53 monitors access requests to the storage devices identified by the storage identification section 51. The access event monitor 53 detects an occurrence of an access request event through monitoring a signal from the first or second input units 41 or 43 or through control of the first control unit 11.

The storage switch determiner 55 determines whether an access-requested storage device is a current access-selected storage device. The storage switch determiner 55 stores necessary information on the access-selected storage device in a memory unit (not shown) composed of, for example, random access memories (RAM).

If the access-requested storage device is the access-selected storage device, the access event executer 57 immediately makes access to the access-selected storage device. If the access-requested storage device is not the access-selected storage device, the access event executer 57 performs an access initialization operation by canceling access-selection of the access-selected storage device and making an access-selection of the access-requested storage device. As storage devices share the control bus line, an access-selection cancel command issued by the second control unit 15 causes all the storage devices to be access-deselected. After access-deselection, the second control unit 15 sends an access-selection command to the access-requested storage device, and the newly access-selected storage device performs a data transfer operation associated with the access request event. Thereafter, a storage device not access-selected does not respond to an access request event.

As described above, the storage interfacing apparatus 10 enables data access to different kinds of storage devices through a shared MMC interface 21. If the access-requested storage device is the access-selected storage device, the second control unit 15 makes immediate access to the access-selected storage device without access initialization.

Figure 7:
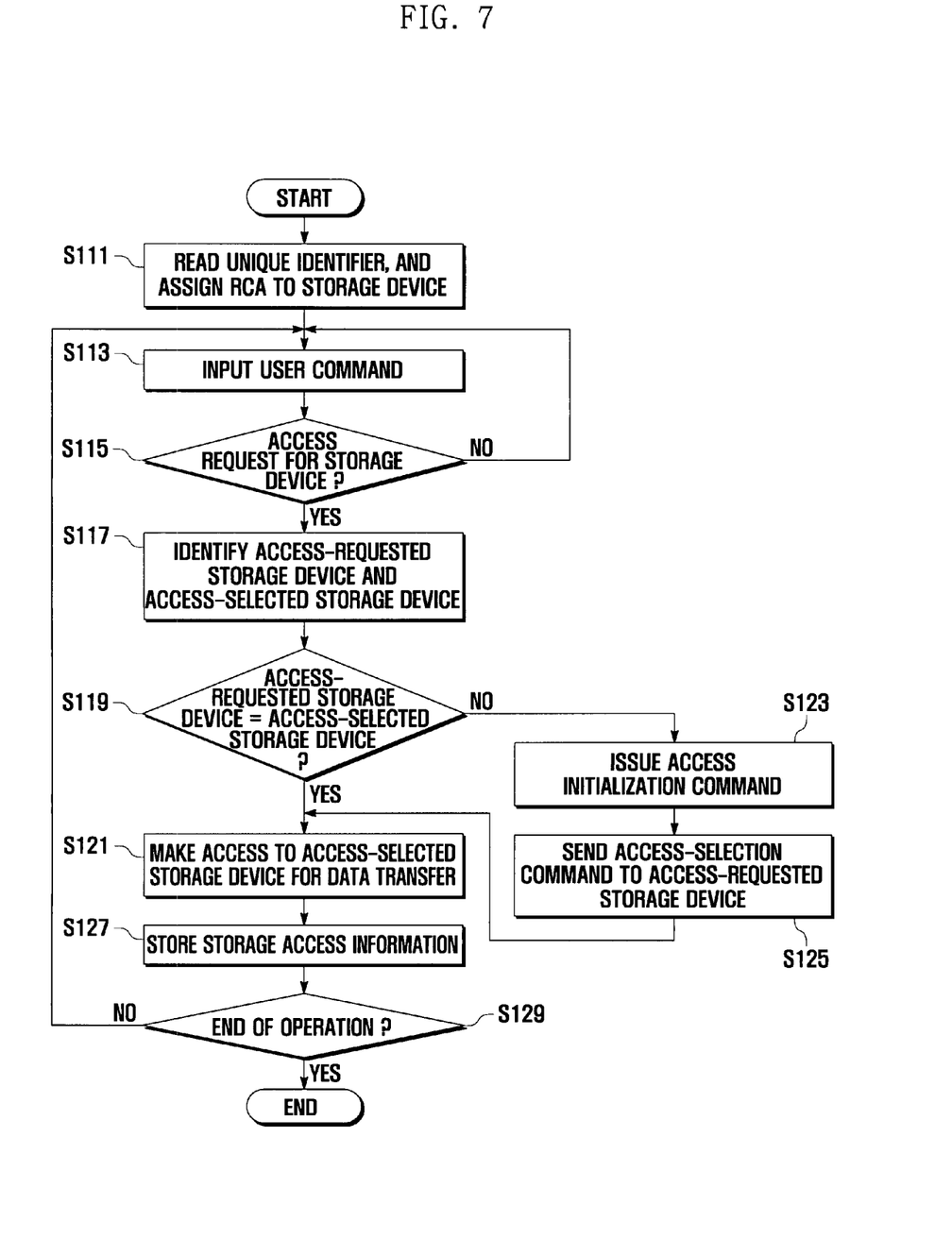
FIG. 7 is a flow chart illustrating a storage interfacing method according to another exemplary embodiment of the present invention.

FIG. 7 is a flow chart illustrating a storage interfacing method according to another exemplary embodiment of the present invention. Referring to FIGS. 3 and 7, the storage interfacing method is described as follows.

In response to an occurrence of a reset event, the second control unit 15 detects available storage devices 25 and 31, recognizes unique identifiers of the detected storage devices 25 and 31, and assigns RCAs thereto (S111). An occurrence of a reset event causes the individual storage devices 25 and 31 to enter into an idle state. The reset event may correspond to a transition of the mobile terminal 100 from a power-off state to a power-on state, or to an access initialization command issued by the second control unit 15. The second control unit 15 sends the content of a storage status register through the control bus line 18, thereby forcing the storage devices 25 and 31 to enter into an inactive state. The second control unit 15 then sends an identifier request command through the control bus line 18. The SD card 31 sends a preset unique identifier to the second control unit 15 in reply to the identifier request command. The second control unit 15 detects the presence of the SD card 31, reads the unique identifier of the SD card 31, and assigns an RCA of, for example, 2 corresponding to the read unique identifier. The second control unit 15 assigns an RCA of, for 1 as a unique identifier to the NAND flash memory 25, and sends the assigned RCA to the NAND flash memory 25 through the control bus line 18. Thereby the NAND flash memory 25 and SD card 31 enter into a stand-by state, in which data access is possible. The second control unit 15 makes access to the NAND flash memory 25 and SD card 31 using the assigned RCAs.

When a user command is input through the first or second input unit 41 or 43 (S113), the first or second control unit 11 or 15, respectively, checks whether an access request event occurs to the NAND flash memory 25 or SD card 31 (S115). The first control unit 11 may forward a detected access request event to the second control unit 15.

If an access request event occurs, the second control unit 15 identifies the access-selected storage device and an access-requested storage device (S117). That is, the second control unit 15 identifies which of the NAND flash memory 25 and SD card 31 is access-requested. The access-selected storage device is identified using storage access information stored in the memory unit (not shown).

The second control unit 15 determines whether the access-requested storage device is the access-selected storage device (S119). If the access-requested storage device is the access-selected storage device, the second control unit 15 makes immediate access to the access-selected storage device without access-deselection and access-selection (S121).

If the access-requested storage device is not the access-selected storage device, the second control unit 15 issues an access initialization command through the control bus line 18 (S123). The access initialization command forces all the storage devices to enter into an inactive state. The second control unit 15 then sends an access-selection command through the control bus line 18 to the access-requested storage device (S125). Upon reception of the access-selection command, the access-requested storage device becomes a new access-selected storage device and enters into a stand-by state. Thereafter, according to the access request event, the access-selected storage device enters into a data transfer state, and performs a requested data transfer operation (S121). The storage devices in the inactive state do not respond to an access request event from the second control unit 15.

After completion of data transfer, the second control unit 15 stores storage access information regarding the access-selected storage device in the memory unit (S127). Steps S113 to S127 are repeated until an end-of-operation event such as power-off is determined to have occurred (S129).

As is apparent to those skilled in the art from the above description, the present invention provides a storage interfacing method and apparatus that enables different types of mass storage devices to share an MMC interface. Thereby the number of pins and size of a control unit are reduced. In addition, if an access-requested storage device is an access-selected storage device, data access to the access-selected storage device is immediately performed without access initialization, thereby enabling fast data transfer.

While preferred embodiments of the present invention have been shown and described in this specification, it will be understood by those skilled in the art that various changes or modifications of the embodiments are possible without departing from the spirit and scope of the invention as defined by the appended claims.

What is claimed is:

1. A storage interfacing method for utilizing a plurality of storage devices for a mobile terminal including at least one native storage device and one compatible storage device with a shared interface, the method comprising:
   detecting an occurrence of an access request event to a particular one of the plurality of storage devices;
   determining whether the particular access-requested storage device is a currently access-selected storage device;
   performing, if the particular access-requested storage device is the currently access-selected storage device, a data transfer operation associated with the access request event on the access-selected storage device immediately, without performing an access initializing operation of all of the plurality of storage devices in communication with the shared interface and without performing an access-selection of the particular access-requested storage device;
   if the particular access-requested storage device is not the currently access-selected device, canceling access-selection of the currently accessed storage device and performing an access initializing operation of all of the plurality of storage devices on a shared bus and subsequently sending an access-selection command to the access-requested storage device to perform an access-selection of the access-requested storage device, and the particular access-requested storage device becomes a new access-selected storage device in a stand-by state and a remainder of the plurality of storage devices remain in an inactive state after initialization.

2. The storage interfacing method of claim 1, further including the step of identifying the storage devices.

3. The storage interfacing method of claim 2, wherein the identifying step comprises assigning a unique identifier to the first storage device.

4. The storage interfacing method of claim 2, wherein the identifying step comprises reading a unique identifier of an SD card.

5. The storage interfacing method of claim 2, wherein the determining step comprises comparing a unique identifier of the access-requested storage device with that of the access-selected storage device.

6. The storage interfacing method of claim 2, wherein the identifying step is performed by an application processor, acting as a control unit.

7. The storage interfacing method of, claim 1, wherein the native storage device comprise a first storage device supporting a MultiMediaCard (MMC) interface, and the compatible storage device comprises a second storage device compatible with the MMC interface.

8. The storage interfacing method of claim 7, wherein the first storage device is a NAND flash memory.

9. The storage interfacing method of claim 7, wherein the second storage device is a Secure Digital (SD) card.

10. The storage interfacing method of claim 1, further comprising:
   issuing, if the access-requested storage device is not an access-selected storage device, an access initialization command to the storage devices; and
   transmitting an access-selection command to the access-requested storage device.

11. The storage interfacing method of claim 10, further comprising storing storage access information regarding the newly access-selected storage device after transmission of the access-selection command.

12. A storage interfacing apparatus for a mobile terminal, comprising:
   a first storage device supporting a MultiMediaCard (MMC) interface;
   a second storage device compatible with the MMC interface;
   a first control unit for call processing;
   a second control unit controlled by the first control unit, for controlling the first and second storage devices, according to the MMC interface, through control and dam buses shared by the first and second storage devices;
   a storage identification section to identify the first and second storage devices;
   an access event monitor to monitor an occurrence of an access request event to one of the first and second storage devices;
   a storage switch determiner to determining whether a particular access-requested storage device is a current access-selected storage device; and
   an access event executer to perform, if the particular access-requested storage device is the currently access-selected storage device, a data transfer operation associated with the access request event on the access-selected storage device immediately, without performing an access initializing operation of all of the plurality of storage devices in communication with the shared interface and without performing an access-selection of the particular access-requested storage device;
   wherein if the particular access-requested storage device is not the currently access-selected device, the access event executer performs an access initializing operation of all of the storage devices on a shared bus and an access-selection of the particular access-requested storage device by sending an access-selection command to the particular access-requested storage device which then becomes a new access-selected storage device,
   wherein a remainder of the storage devices remain in an inactive state after initialization.

13. The storage interfacing apparatus of claim 12, wherein the first storage device is a NAND flash memory.

14. The storage interfacing apparatus of claim 12, wherein the second storage device is a Secure Digital (SD) card.

15. The storage interfacing apparatus of claim 12, wherein the first storage device is a fixed storage device.

16. The storage interfacing apparatus of claim 12, wherein the second, storage device is a removable storage device.

17. The storage interfacing apparatus of claim 12, wherein the second control unit is an application processor.

18. The storage interfacing apparatus of claim 12, further comprising a memory unit, controlled by the second control unit, for storing storage access information regarding an access-selected one of the first storage device and second storage device.

19. The storage interfacing apparatus of claim 18, further comprising an input unit for sending, independent of the first control unit, an input signal to the second control unit.

20. A storage interfacing apparatus for a mobile terminal, comprising:
   a first storage device supporting a MultiMediaCard (MMC) interface;
   a second storage device compatible with the MMC interface;
   a control unit for controlling the first and second storage devices, according to the MMC interface, through control and dam buses shared by the first and second storage devices;
   a storage identification section to identify the first and second storage devices;
   an access event monitor to monitor an occurrence of an access request event to one of the first and second storage devices;
   a storage switch determiner to determining whether a particular access-requested storage device is a current access-selected storage device; and
   an access event executer to perform, if the particular access-requested storage device is the current access-selected storage device, a data transfer operation associated with the access request event on the access-selected storage device immediately, without performing an access initialization of all of the storage devices in communication with the shared interface and without performing an access-selection of the particular access-requested storage device;
   wherein if the particular access-requested storage device is not the currently access-selected device, the access event executer performs an access initializing operation of all of the storage devices on a shared bus followed by an access-selection of the particular access-requested storage device by sending an access-selection command to the particular access-requested storage device which then becomes a new access-selected storage device, and
   wherein the particular access-requested storage device becomes the new access-selected device in a stand-by state, and a remainder of the storage devices remain in an inactive state after initialization.

21. A storage interfacing apparatus for a mobile terminal, the apparatus utilizing a first storage device supporting a MultiMediaCard (MMC) interface and a second storage device compatible with the MMC interface, the first and second storage devices sharing control and data buses for MMC interfacing, the apparatus comprising:
- a storage identification section to identify the first and second storage devices;
- an access event monitor to monitor an occurrence of an access request event to one of the first and second storage devices;
- a storage switch determiner to determining whether a particular access-requested storage device is a current access-selected storage device; and
- an access event executer to perform, if the particular access-requested storage device is the current access-selected storage device, a data transfer operation associated with the access request event on the access-selected storage device immediately, without performing an access initialization of all of the storage devices in communication with the MMC interface and without performing an access-selection of the particular access-requested storage device;
- wherein if the particular access-requested storage device is not the currently access-selected device, the access event executer performs an access initializing operation of all of the storage devices on a shared bus followed by an access-selection of the particular access-requested storage device by sending an access-selection command to the particular access-requested storage device, and
- wherein the particular access-requested storage device becomes the new access-selected device in a stand-by state, and wherein a remainder of the storage devices remain in an inactive state after initialization.

* * * * *

UNITED STATES PATENT AND TRADEMARK OFFICE
CERTIFICATE OF CORRECTION

| | |
|---|---|
| PATENT NO. | : 8,010,752 B2 |
| APPLICATION NO. | : 11/821273 |
| DATED | : August 30, 2011 |
| INVENTOR(S) | : Young Su Shin |

It is certified that error appears in the above-identified patent and that said Letters Patent is hereby corrected as shown below:

Column 6, Claim 1, Line 56 should read as follows:
-- ...access-selection command to the particular... --

Column 6, Claim 1, Line 57 should read as follows:
-- ...storage device; and --

Column 7, Claim 12, Line 47 should read as follows:
-- ...through control and data... --

Column 7, Claim 12, Line 58 should read as follows:
-- ...device is the current access... --

Column 7, Claim 12, Lines 61-62 should read as follows:
-- ...without performing access... --

Column 7, Claim 12, Lines 62-63 should read as follows:
-- ...access initialization of all the storage devices... --

Column 8, Claim 12, Lines 1-2 should read as follows:
-- ...operation of all the storage devices... --

Column 8, Claim 12, Line 6 should read as follows:
-- ...storage device, and --

Column 8, Claim 16, Line 16 should read as follows:
-- ...the second storage device... --

Column 8, Claim 20, Line 35 should read as follows:
-- ...and data buses shared... --

Signed and Sealed this
Twenty-sixth Day of June, 2012

David J. Kappos
*Director of the United States Patent and Trademark Office*

Column 8, Claim 20, Line 35 should read as follows:
-- ...buses shared between the first... --

Column 8, Claim 20, Line 40 should read as follows:
-- ...event to a particular one of the... --

Column 8, Claim 20, Lines 42-43 should read as follows:
-- ...determining whether the particular... --

Column 8, Claim 20, Lines 49-50 should read as follows:
-- ...without performing access initialization... --

Column 8, Claim 20, Line 51 should read as follows:
-- ...with the MMC interface... --

Column 8, Claim 20, Line 55 should read as follows:
-- ...not the current access-selected... --

Column 9, Claim 21, Line 8 should read as follows:
-- ...event to a particular one of the... --

Column 9, Claim 21, Lines 10-11 should read as follows:
-- ...determining whether the particular... --

Column 9, Claim 21, Line 17 through Column 10, Claim 21, Line 1 should read as follows:
-- ...without performing access initialization... --

Column 10, Claim 21, Line 4 should read as follows:
-- ...storage device via an access-selection command; --

Column 10, Claim 21, Line 6 should read as follows:
-- ...not the current access-selected... --

Column 10, Claim 21, Lines 7-8 should read as follows:
-- ...operation of all the storage devices... --